UNITED STATES PATENT OFFICE.

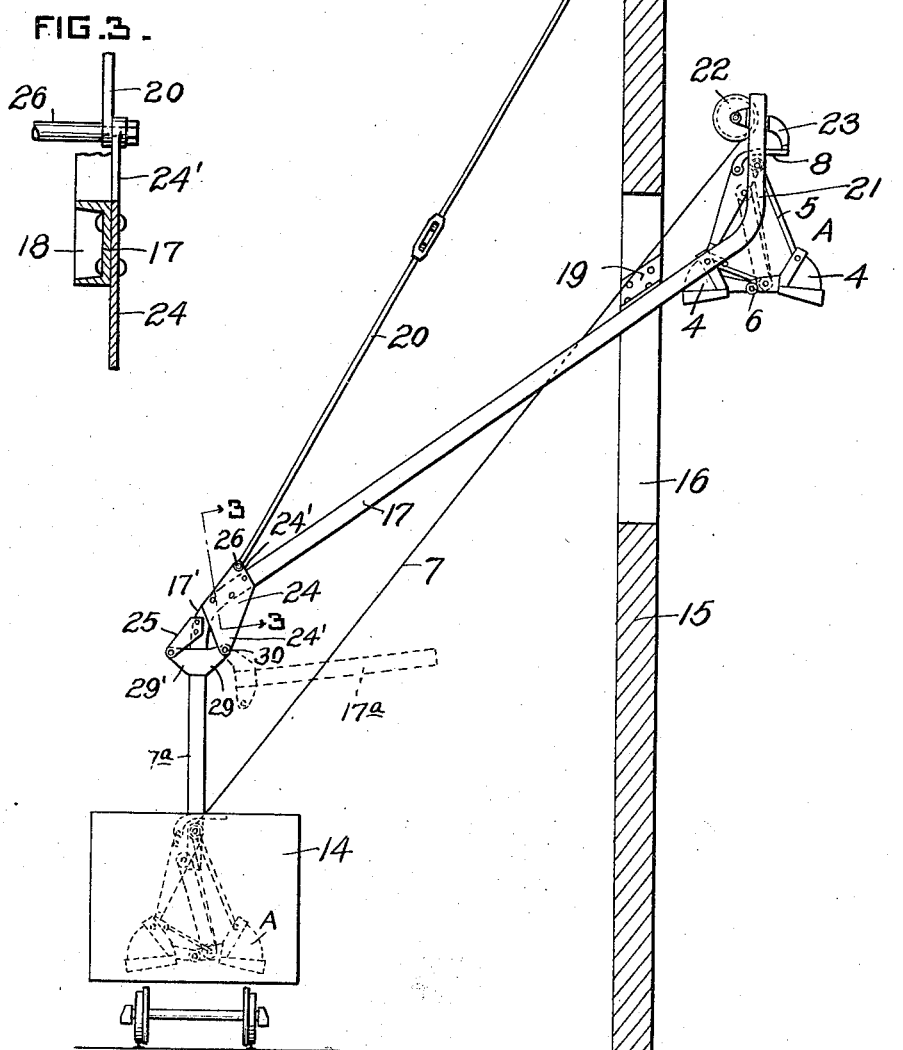

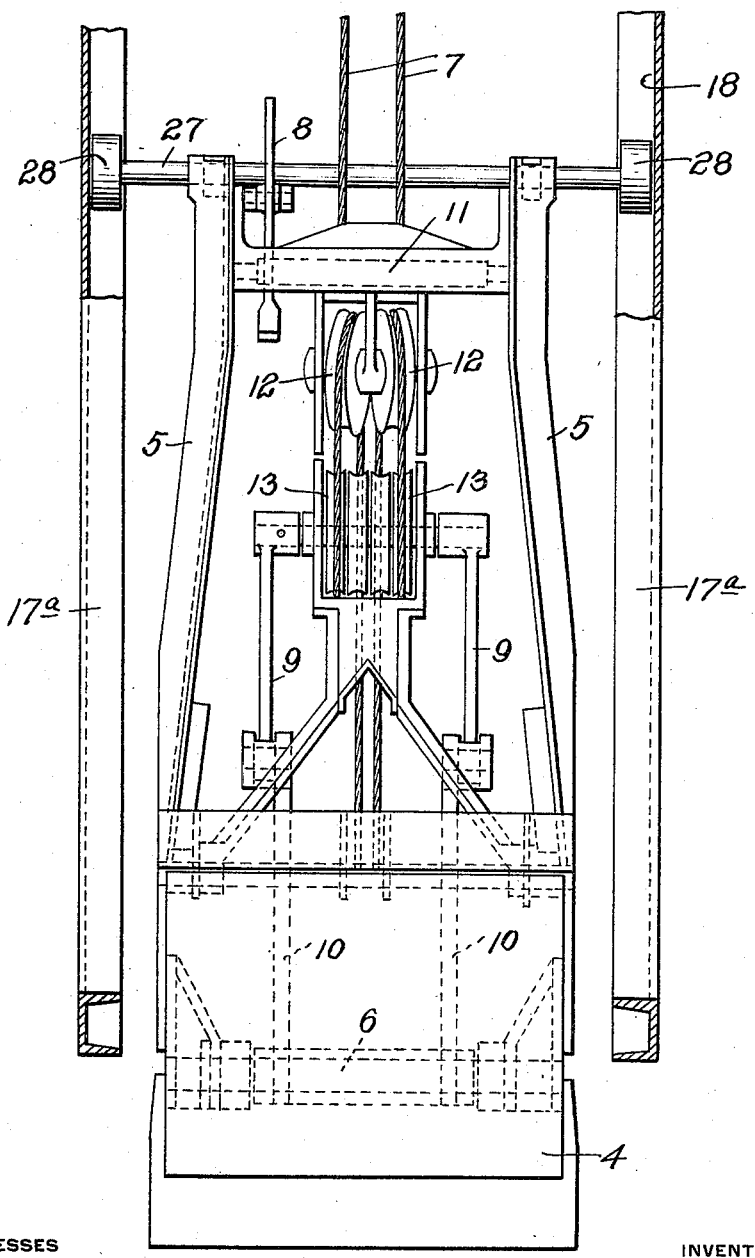

WILLIAM M. VENABLE, OF PITTSBURGH, PENNSYLVANIA, ASSIGNOR TO BLAW-KNOX COMPANY, A CORPORATION OF NEW JERSEY.

TRANSFERRING AND UNLOADING APPARATUS.

1,311,195.

Specification of Letters Patent. Patented July 29, 1919.

Application filed September 26, 1918. Serial No. 255,785.

*To all whom it may concern:*

Be it known that I, WILLIAM M. VENABLE, a citizen of the United States, residing at Pittsburgh, in the county of Allegheny and State of Pennsylvania, have invented certain new and useful Improvements in Transferring and Unloading Apparatus, of which the following is a specification.

My invention relates to improvements in transferring and unloading apparatus, and has reference more particularly to the provision of an upwardly inclined guiding means for a grab-bucket, said means preferably comprising channeled guide members oppositely disposed in parallelism and in whose upwardly inclined slideways roller devices formed in the bucket are designed to travel as the loaded bucket moves from a coal skip or wagon to its unloading point.

The primary objects of the invention are therefore to provide a transfer and unloading means of this character, and wherein the load is transported along a predetermined fixed path from a loading point to an unloading point located at some distance from and at a higher elevation than the unloading point; to provide said means with a trip mechanism positioned near the unloading point whereby to open the bucket and dump the load carried thereby; to provide a means of this character capable of being formed to provide a curved, inclined or offset path for the bucket whereby the latter may be guided to pass obstructions, or to pass through openings in walls, or to register with coal wagons at loading points; and in general to facilitate bucket movement whether, for instance, in the transfer of material, as coal, from cars or pits to boiler rooms or dumps, or into overhead bunkers from which locomotives may receive their charges of coal.

My invention is characterized by a maximum of efficiency and durability in use, and further contemplates certain novel details of construction, combination and arrangement of parts of the improved apparatus, whereby certain important advantages are attained as will be more fully described hereinafter, and pointed out in the claims.

These, together with such other objects and advantages as are incident to my invention, I attain by means of a construction, illustrated in preferred form in the drawings, wherein—

Figure 1 represents a side elevation of my improved bucket guiding and transporting apparatus;

Fig. 2 is a front elevation of the bucket and of the hinged lower end, or loading point, of the said apparatus; and Fig. 3 is a slightly enlarged detail view taken at one side of the hinge on the line 3—3 of Fig. 1.

The apparatus herein described is particularly adapted for use in connection with a single-line type of bucket, such, for example, as that shown in open position in Fig. 2, the construction of which is fully set out in my Letters Patent #1,258,833 of March 12, 1918. Briefly it may be stated that a bucket of this type may consist of a pair of hinged scoop segments 4 supported at their outer corners by corner bars 5, which segments are adapted to be opened and closed by lowering or raising the main or bucket hinge 6, and to be operated automatically by the single holding and operating line or cable 7, or to be opened to discharge its contents by actuating the trip lever 8, which, in the closed position of the segments, operates to throw the links 9, 10, and thus open the bucket segments. The upper ends of the bars 5 together with the sheave block support 11 constitute the head of the bucket, the sheaves 12, 13, about which the cable 7 is reaved, being respectively carried by the support 11 and links 9.

Referring now more particularly to Fig. 1 of the drawings, in which the bucket is designated generally at A, the numeral 14 denotes a coal car or truck, and 15 designates the wall of the building or other structure into which latter the coal is intended to be dumped after the bucket containing the coal has passed through the opening 16 in the wall, which opening, as shown, is located above and at a distance from the car 14.

In order that the loaded bucket may move along a predetermined path from the car to the desired unloading point within the building, I provide a pair of channel-shaped guides 17 which are disposed in parallelism and whose channels 18 face oppositely and inwardly, and these guides may be supported or suspended in any desired manner from the wall, or other support, as by the flanges 19 and the turnbuckle rods 20. As will be seen, the guides have their main body portions inclined in a direction leading upwardly from the car and thence through the opening 16, the upper ends 21 of the guides being bent or offset, as shown, in order to check the ascent of the bucket, and are provided terminally with a single drum motor 22 to operate the bucket cable 7 in the raising and lowering of the bucket, and with a stop 23 arranged to press against the trip lever 8 and thereby dump the load in the elevated position of the bucket. I provide the head of the bucket with a horizontal shaft 27 having at its outer ends rollers 28 designed to travel in the channels 18 of the guides.

The reference character 17$^a$ designates the lower end portions of the guides 17 and these depend to extend slightly within the open top of the car 14 from downwardly curved guide portions 17' which are provided with side plates 24 and 25 secured thereto. Extending through the upper terminals or ears 24' of each of the plates 24 is a rod 26 to which the lower ends of the turnbuckle rods are attached; and I form the upper ends of the lower guide portions 17$^a$ with wings or extensions 29, 29', the former of which is hinged at 30 to the lower dependent portion 24' of the plate 24, and the latter is detachably connected to plate 25 in such a manner that when the portions 27$^a$ are swung from their inoperative positions, as indicated in dotted lines in Fig. 1, to their operative positions the channels 18 of each guide register, and provide an uninterrupted path or passage within which the rollers may securely travel during the movement of the bucket between the car and the stop 23.

Briefly, the operation may be described as follows. When the grab-bucket has been lowered and guided into the car, the cable 7 is tightened by the drum motor 22 and this brings the scoop segments 4 together and gathers up a load. A further pull upon the cable will then serve to elevate the bucket and with the rollers traveling in the channels the bucket will take the path determined by the guides until the stop is reached, which, pressing against the trip lever, will serve to dump the load at the requisite point. Slackening of the cable permits the bucket to travel in a reverse direction toward the car, and the operation is again repeated until the car is unloaded. When this has been accomplished the guide portions 17$^a$ may be swung up to permit removal of the car and the replacement by another.

I do not desire to be understood as limiting myself to the employment of single-line buckets only, as it will be obvious to those skilled in the art that buckets of other types may readily be used in connection with the invention; and it will also be apparent that the guides may be formed or bent to provide guideways having contours or formations different from that shown in the preferred arrangement of the drawings, such formation being wholly dependent upon the conditions which may be presented in each case.

What I claim is:

1. The combination with a clam-shell bucket comprising pivoted segments and a closing line therefor, of a bucket guiding means formed with a slideway having end portions constructed and arranged with reference to the bucket and to the material to be transported thereby so as to constitute vertically disposed unloading and loading stations, that portion constituting the unloading station provided with segment opening means and an operating device for the bucket closing line.

2. The combination with a support, of a bucket guiding means formed with a slideway having portions constructed and arranged with reference to the bucket and to the material to be transported thereby so as to constitute unloading and loading stations, part of said slideway intermediate said stations being inclined or offset, and those portions constituting loading and unloading stations being reversely curved, one of said portions being hinged for swinging movement between its inoperative and operative positions.

3. The combination with a support, of a bucket guiding means formed with a slideway having portions constructed and arranged with reference to the bucket and to the material to be transported thereby so as to constitute unloading and loading stations, part of said slideway intermediate said stations being inclined or offset, and those portions constituting loading and unloading stations being reversely curved, one of said portions being hinged for swinging movement between its inoperative and operative positions, and bucket operating means positioned at the other of said portions.

4. In transfer apparatus, the combination of a clam-shell bucket having pivoted segments adapted to open and close and provided adjacent its head with anti-friction roller members, bucket guiding means comprising inclined slideways adapted to coöperate with said members and including an end portion constituting an unloading station, co-acting means on said bucket and said end portion for opening the segments, and a hoist drum provided with a segment closing line to said bucket.

5. In transfer apparatus, the combination of a clam-shell bucket having pivoted segments adapted to open and close and provided adjacent its head with anti-friction roller members, bucket guiding means comprising inclined slideways adapted to coöperate with said members and including an end portion constituting an unloading station, co-acting means on said bucket and said end portion for opening the segments, and a hoist drum provided with a segment closing line to said bucket, the other end portion of said guiding means being vertically disposed and hinged.

6. In transfer apparatus, the combination with a load container, of a bucket comprising opening and closing segments and a head therefor, bucket guiding means having loading and unloading portions and embodying inclined or offset slideways engaging said head at each side of the bucket to guide the latter in its travel between said portions, said loading portion designed to position the bucket with reference to the container during the closing movement of the segments, and a bucket operating hoist device positioned at the unloading portion and having a segment closing line leading to the head of the bucket, said unloading portion supported independently of the load container.

7. In transfer apparatus, the combination with a movable load container, of a bucket comprising opening and closing segments and a head therefor, anti-friction means for said head, fixed bucket guiding means having loading and unloading portions and embodying slideways for said anti-friction means supported independently of said container, said loading portion designed to position the bucket with reference to the container in the closing movement of the segments and movable to clear the container when the latter is emptied of its load, a bucket operating means having a part thereof positioned adjacent the unloading portion and having a closing line leading therefrom to the head of the bucket, said unloading portion having an opening member for the bucket segments.

WILLIAM M. VENABLE.

Copies of this patent may be obtained for five cents each, by addressing the "Commissioner of Patents, Washington, D. C."